Oct. 28, 1930.                M. L. CLELAND                    1,779,662
                          RACK FOR FORD AUTOMOBILES
                             Filed March 8, 1930
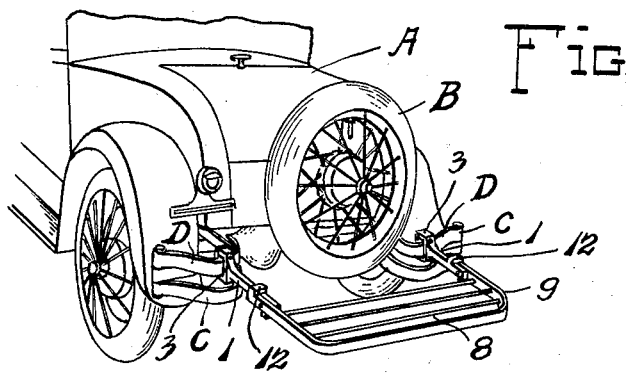
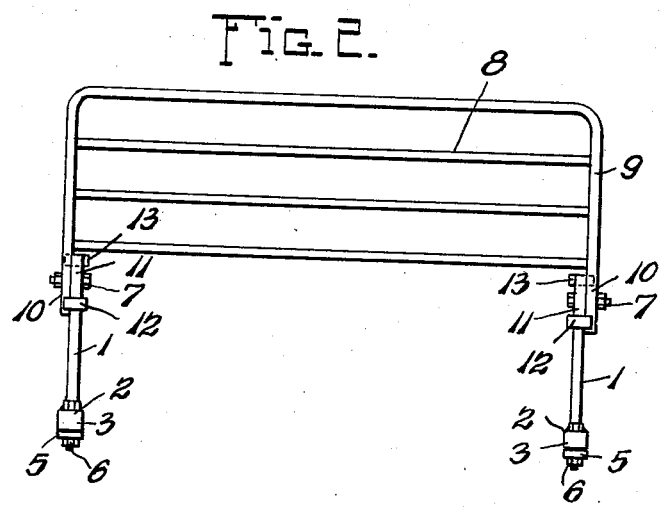
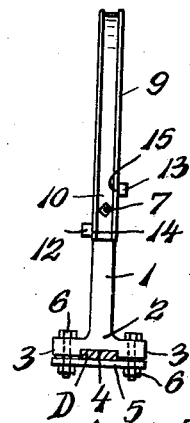
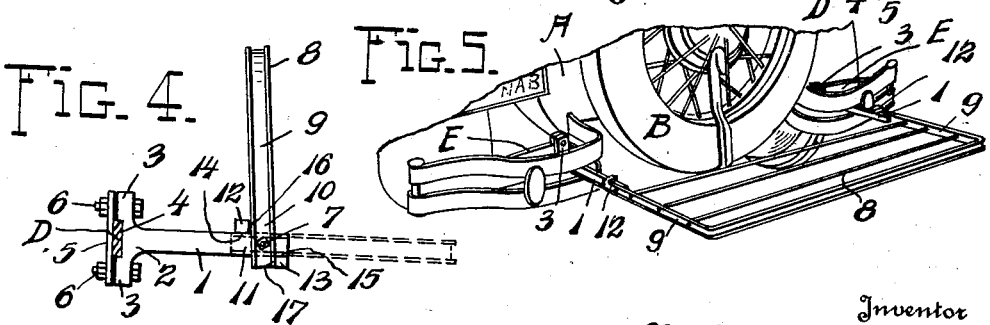
Inventor
M. L. Cleland.

Patented Oct. 28, 1930

1,779,662

UNITED STATES PATENT OFFICE

MELVIN L. CLELAND, OF HASTINGS, NEBRASKA, ASSIGNOR TO G. A. ROTH MANUFACTURING COMPANY, OF HASTINGS, NEBRASKA, A CORPORATION OF NEBRASKA

RACK FOR FORD AUTOMOBILES

Application filed March 8, 1930. Serial No. 434,345.

This invention has to do with luggage carriers of the type applicable to the front or rear bumper of an automobile. It is usual to apply a luggage carrier to the rear of an automobile, and for this reason the following detailed description of my invention will have reference to the rear part of an automobile.

My invention is characterized by extreme simplicity inasmuch as it involves only two main relatively movable parts, thereby making for ease of attachment, and low cost of production, as well as other desirable features.

The invention involves a pair of brackets, each of which is rigidly though detachably securable to a bumper, and a luggage supporting rack member having a pivotal connection with the outer ends of the brackets. The pivotal connection is such as to provide for adjustment whereby the rack member may be held against movement in its operative and inoperative positions. For the purpose of positively preventing movement of the rack member beyond certain limits, I provide lugs oppositely disposed from the pivots, and locate a portion of the rack for movement between said lugs. The lugs are so spaced as to support the rack in a horizontal position and also in a position slightly inclined forward of the vertical. Moreover, each bracket is provided with a pair of lugs whereby each reinforces the other in its supporting function. The bracket members themselves are provided with clamping means for securement to the bumper, and provision is made for spacing the rack portion from the spare tire in both limiting positions of the rack so that access may be easily had to said tire without changing the position of the rack member.

While I consider this invention particularly applicable to the Ford type of automobile, I desire it to be understood that it is well within the province of my invention to apply the same to other makes of automobiles.

For a full and more complete understanding of my invention, reference may be had to the following description and accompanying drawings, in which—

Figure 1 is a fragmentary perspective view of the rear part of a Ford automobile, showing my novel rack construction applied thereto in operative position.

Figure 2 is a top plan view of my novel luggage carrier.

Figure 3 is a side elevational view of the construction illustrated in Figure 2.

Figure 4 is a side elevational view similar to Figure 3, but illustrating the feature providing for supporting the rack member in inoperative and operative positions, the latter being indicated by dotted lines.

Figure 5 is a view similar to Figure 1, but showing the rack bracket attached to the rear of an automobile and between the bumper rails.

I illustrate the rear of an automobile at A, having detachably secured thereto a spare tire B and bumperettes C, though bumpers extending clear across the rear may be equally employed insofar as my invention is concerned.

My improved carrier is applied to the bumperettes C as illustrated in Figure 1. Said carrier includes a pair of brackets 1 having forked ends 2, the spaced arms 3 of which are separated by the channel grooves 4. Each of said grooves is fashioned to snugly receive a rail D of each bumperette C, the depth of the groove being slightly less than the thickness of the rail. A plate 5 is applied to the inner face of the rail D, and bolt or other suitable means 6 pass through the plate 5 and arms 3 and straddle the rail D. It will now be apparent that, with the rail disposed in the groove and the plate 5 applied, a slight space will separate the arms 3 from said plate, so that the bolts may be tightened to provide a firm and substantial grip of the clamping means on the rail.

Each bracket 1 when applied as illustrated in Figure 1, extends substantially horizontally and rearwardly of the vehicle A. The outer frame 9 of a luggage carrying rack 8 is provided with extensions 10 which flank the brackets 1 outwardly and overlap the rear extensions 11 thereof. The portions 10 and 11 are joined by a pivotal connection at 7, which connection may be loose or may be tightened by means of the instrumentalities constituting the pivotal connection. Extending upwardly from the portion 11 of each bracket 1 is a lug 12 and depending downwardly from the portion 11 and substantially diagonally opposed to the lug 12 is a second lug 13, said lugs being integral with the part 11 or secured thereto in any suitable manner. Said lugs project laterally outwardly beyond the body of each bracket 1 and the extension 10 of the rack frame 9 is capable of pivotal movement between said lugs, engaging the bottom 14 of the lug 12 and the top 15 of the lug 13 when in operative position, as shown in Figures 1, 2 and 3, and engaging the rear face 16 and the forward face 17 of the lugs 12 and 13 respectively in its limiting inoperative position, as illustrated in Figure 4. It will thus be apparent that, while the lug 12 is capable, together with pivotal connection at 7, of supporting the rack 8 in a substantially horizontal position, the lug 13 at this time provides reinforcement to strengthen the support of the rack member. Similarly, while the lug 13 and pivotal connection at 7 will serve to maintain the rack 8 in its extreme inoperative position as illustrated in Figure 4, the lug 12 provides proper reinforcement for supporting the rack. It will be noted that the point at which the rack frame is attached to the brackets, is spaced from the tire a substantial distance so that, regardless of the position of the rack, access to the tire may be had without disturbing the adjustment of the rack.

From the foregoing, it will be evident that I have provided a luggage carrier containing a minimum number of parts, thereby minimizing the cost of production, all the parts being very simple, and the whole device being applicable to and removable from any set of bumperettes, or a bumper, as the case may be, in a jiffy, and without the use of special tools.

In the form of my invention illustrated in Figure 5, the rack construction is substantially identical with that heretofore described, but is attached to a bumper support E on the body of the automobile and extends intermediate the bumper rails D to provide reinforcement to the main clamping means at 3, by supporting the rack and holding the same against downward movement.

Having thus described my invention, what I claim as new and desire to secure by Letters Patent of the United States, is—

In a luggage carrier of the class described, a bumper, bracket means clamped thereto, a rack having arms pivoted to said means, said means having lugs on opposite sides of the pivot, said lugs having portions spaced horizontally a distance greater than the cross sectional height of said rack arms and vertically a distance substantially equal to said height, whereby said lugs reinforce each other in supporting said rack in operative and inoperative positions selectively.

In testimony whereof I affix my signature.

MELVIN L. CLELAND.